United States Patent
Schollmeier et al.

(10) Patent No.: US 7,933,206 B2
(45) Date of Patent: Apr. 26, 2011

(54) METHOD FOR ADAPTING LINK WEIGHTS IN RELATION TO OPTIMIZED TRAFFIC DISTRIBUTION

(75) Inventors: Gero Schollmeier, Gauting (DE); Christian Winkler, Munich (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 248 days.

(21) Appl. No.: 12/367,802

(22) Filed: Feb. 9, 2009

(65) Prior Publication Data
US 2009/0141633 A1 Jun. 4, 2009

Related U.S. Application Data

(63) Continuation of application No. 10/550,229, filed as application No. PCT/EP2005/050149 on Jan. 14, 2005, now abandoned.

(51) Int. Cl.
*H04L 12/28* (2006.01)
(52) U.S. Cl. .......................................... 370/238; 709/241
(58) Field of Classification Search ........................ None
See application file for complete search history.

(56) References Cited

U.S. PATENT DOCUMENTS

| | | |
|---|---|---|
| 6,535,923 B1 | 3/2003 | Giroir |
| 6,584,071 B1 | 6/2003 | Kodialam et al. |
| 6,611,874 B1 | 8/2003 | Denecheau et al. |
| 2003/0028670 A1 | 2/2003 | Lee et al. |
| 2003/0156536 A1* | 8/2003 | Oki et al. ..................... 370/229 |

FOREIGN PATENT DOCUMENTS

WO    WO 02/46947 A1    6/2002

OTHER PUBLICATIONS

J. Harmatos, "A Heuristic Algorithm for Solving the Static Weight Optimisation Problem in OSPF Networks", IEEE, vol. 3, Nov. 25-29, 2001, pp. 1605-1609.

* cited by examiner

*Primary Examiner* — Kwang B Yao
*Assistant Examiner* — Alex Skripnikov
(74) *Attorney, Agent, or Firm* — Laurence A. Greenberg; Werner H. Stemer; Ralph E. Locher

(57) ABSTRACT

The invention relates to a method which is used to adapt link weights or, link costs, for optimized traffic distribution within a communication network. According to said method, a loop is circulated until an interruption criterion is met. The individual iterations comprise the following steps: Routing of traffic within the communication network is calculated based on link cost paths. Parameter values used for opt imization e.g. the link-related volume of traffic, are determined for the individual links by means of the calculated path, and an expected volume of traffic and the link are determined for the parameter having the highest value. When the highest determined value is equal to or less than the valve of the previous step (interruption criterion), the link costs are increased for the determined link. Said method enables link costs and paths for optimized traffic distribution to be determined in an economical manner.

19 Claims, 1 Drawing Sheet

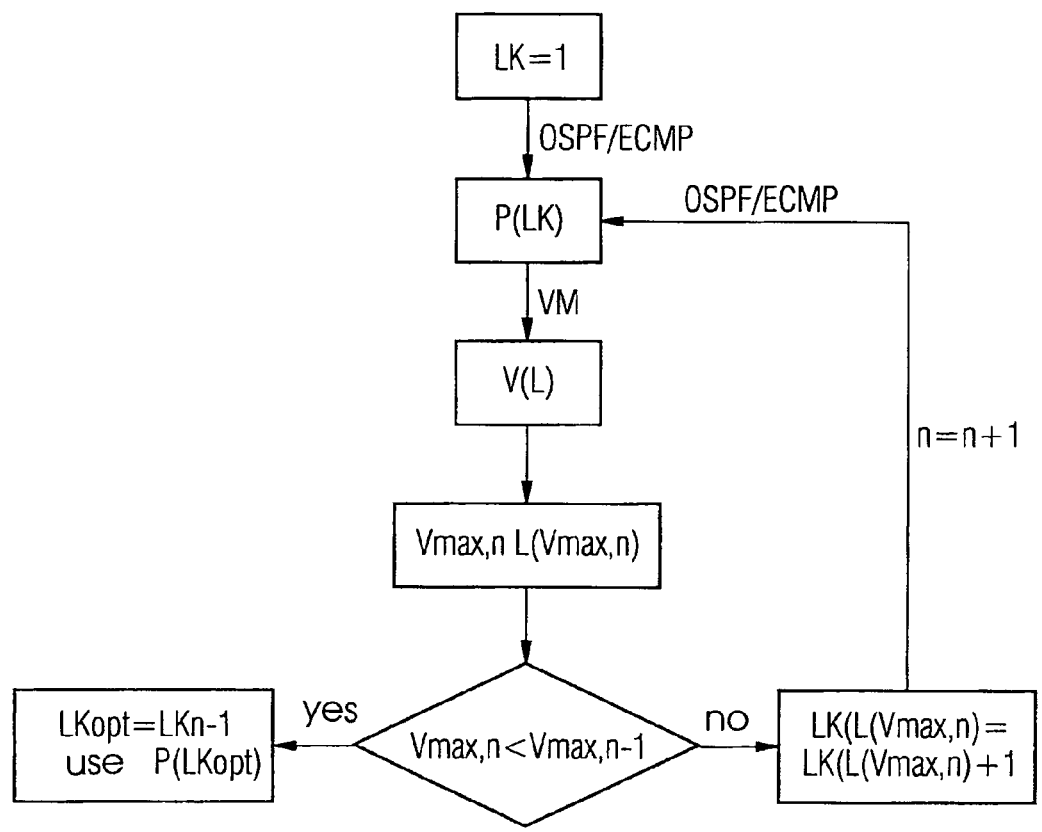

METHOD FOR ADAPTING LINK WEIGHTS IN RELATION TO OPTIMIZED TRAFFIC DISTRIBUTION

CROSS REFERENCE TO RELATED APPLICATIONS

This application is a continuation of U.S. patent application Ser. No. 10/550,229, filed Sep. 20, 2005, which was the US National Stage of International Application No. PCT/EP2005/050149, filed Jan. 14, 2005 and claims the benefits thereof. The International Application claims the benefits of German application No. 10 2004 004 793.6 filed Jan. 30, 2004. The prior applications are incorporated by reference herein in their entirety.

FIELD OF THE INVENTION

The invention relates to a method for adapting link weights in a communication network formed from links for an optimized distribution of traffic within the communication network as regards the volume of traffic expected for the communication network and in relation to a parameter relating to link usage.

SUMMARY OF THE INVENTION

The invention lies within the area of communication technology and in particular deals with the transmission of data over packet-oriented networks.

The optimization of data transmission over packet-oriented networks, especially over IP (Internet Protocol)-based networks is currently an important area of activity in the field of network technologies. the transmission of data with different quality-of-service requirements in particular being a prerequisite for the provision of new services, such as for example the transmission of real-time traffic over packet-oriented networks. To optimize transmission as much as possible, different parameters, such as delay, noise susceptibility or traffic distribution must be taken into account.

The best possible distribution of the traffic routed over a communication network is important, on the one hand in relation to avoiding overload situations, on the other hand good traffic distribution is the requirement for a good utilization of the existing resources and especially the bandwidth available. The traffic distribution within a communication network depends on the routing within the network or the paths on which the traffic is routed through the network. By far the most widespread routing method for packet-oriented networks based on an IP protocol is what is known as the OSPF (Open Shortest Path First) method or protocol. In this method, for traffic to be routed between two nodes, the shortest path in the sense of a metric between the two nodes is defined. The path is normally determined with the aid of what are known as link costs. The terms link weight or link weights which are normally employed by specialists as synonymous with link costs are also referred to below. The link costs or link weights are values administratively assigned to the links, said values representing a measure of how well the relevant link is being used. In the simplest case the link costs are equal to 1 for each link, i.e. all links are treated in the same way. For routing which minimizes the link costs this method automatically determines the shortest path between two nodes as regards the number of links or the number of hops. Changing the link costs allows the determination of the routes and thus the distribution of the traffic within a communication network to be influenced. Controlling the traffic distribution by adapting the link costs is generally possible with routing methods which operate using a metric and the allocation of link costs, e.g. in the IS-IS (Intermediate System-Intermediate System) protocol or for example the ECMP (Equal Cost Multiple) method, which was defined within the framework of the OSPF protocol and makes provision for the use of a number of paths determined by means of OSPF for routing between two nodes.

Conventional methods for optimizing traffic distribution by adapting the link costs are comparatively complicated. Usually the link costs are optimized globally by optimizing a target function which reflects the topology of the network. Because of the complexity of this method the link costs are currently frequently not optimized. Unavoidable adaptations of the link costs are frequently performed manually, which entails a high risk of errors. Thus the traffic optimization in real networks is likely to be less than optimal.

The object of the invention is to specify a simple method for determining the link costs in a communication network as regards optimized traffic distribution The object is achieved by the claims.

The thinking behind the invention is that the link costs or link weights of heavily loaded links should be increased to reduce the traffic load on these links. A parameter is used for the optimization which represents the measure of the loading of the individual links. Preferably this parameter is specified by the traffic load of the individual links. Other options are the relative traffic load in relation to the link bandwidth, any traffic-dependent costs arising for link usage (possibly even in the form of real charges arising), the availability of the links, the run time on the individual links or the load-bearing capabilities of the end nodes of the links concerned. The starting point of the invention is that the volume of traffic to be carried by the network is known or at least an estimate of said volume exists. In traffic theory what is known as the traffic matrix is usually used to specify the traffic volume more precisely. The traffic matrix specifies the volume of traffic to be transported between pairs of source and destination nodes. For traffic routed through the communication network a source node for example corresponds to an ingress node and a destination node to an egress node, so that the traffic matrix features an entry in relation to these two nodes for the traffic transported between them.

For optimization as regards the parameter the procedure is as follows. First the link costs of the individual links are initialized, i.e. start values are assigned to them. For the links a distinction is preferably made between the two directions, i.e. a connection between two nodes corresponds to two directed links, each of which transports the traffic once from the first node to the second and once in the other direction. The invention can then be further developed so that, especially for symmetrical traffic matrices, the optimization of the link costs is performed for both directions simultaneously. After the assignment of start values for the link costs paths for the routing of traffic within a communication network are computed with the aid of the routing protocol (for example OSPF or IS-IS). With the aid of the assumed traffic volume the traffic carried on these paths and thereby the traffic volume on the individual links can be calculated or determined. The link is then determined for which the parameter, for example the traffic volume, has the highest value. Subsequently the value of the link costs for the link determined is increased, by 1 for example. Calculating the paths, defining the values of the parameter, determining the link for which the parameter has the highest value and increasing the value of the link costs for the link determined is performed as a loop which is run until such time as the value of the parameter for the link with the highest parameter value determined in a step is higher than the parameter determined in the previous step or sequence for the link with the highest parameter value. If this abort criteria is fulfilled, the values for the link costs defined in the step before last and the associated paths for routing within the communication network are determined.

An improved or optimized traffic distribution is obtained through the invention by increasing the link costs of heavily loaded links. In comparison to conventional methods the inventive method is simpler and can be implemented without any problems. For determining paths within the framework of the ECMP (Equal Cost Multiple) method it is useful to operate in the method with whole-number link costs or whole-number increases in the link costs, since in this way it is more likely that alternative paths with the same accumulated costs for the connection of two nodes are produced, so that, as provided for in the ECMP method, traffic can be distributed to the various equivalent paths. As a start point it is useful to initialize all link costs with the same value, for example with 1.

The inventive method can be performed using central or distributed computing capacity. For parts thereof, e.g. path calculation, there can be recourse to conventional methods (which for example are defined within the framework of the OPSF or IS-IS protocol).

The object of the invention is explained in more detail below within the context of an exemplary embodiment which refers to a flowchart.

BRIEF DESCRIPTION OF THE DRAWING

The sole FIGURE shows an exemplary flowchart according to the invention.

DETAILED DESCRIPTION OF THE INVENTION

The exemplary embodiment starts from the assumption that the communication network is an IP network which is formed with nodes and links and that paths are to be determined for routing within the framework of the ECMP concept. To begin with the link costs LK are initialized with the value 1. On the basis of these link costs LK the ECMP paths P(LK) are then calculated. The calculation is undertaken by determining the paths with the lowest accumulated link costs LK for routing between two nodes, as is provided for in the OSPF protocol.

Least-cost paths to a destination node can for example be determined in the following way. All neighboring nodes of the destination node are initially determined and these neighboring nodes are assigned the link costs as node costs. This defines the routing for this first ring of nodes around the destination node. The procedure below is undertaken ring-by-ring, moving up from a ring to the next higher ring in each case. A ring in this case is specified by the fact that a specific number of links at least have to be passed through to reach the destination node. The costs of the individual paths are successively calculated ring-by-ring. In this case in each step the path costs are made up of the sum of the link costs and the node costs, with link costs being the current costs of the outgoing link in each case and the node costs being the actual costs of the relevant end node of this link in each case. The costs of the paths calculated in this way are then compared and only those paths are retained which have minimal path costs (as is also provided for within the framework of the OSPF concept). A number of paths with the minimum path costs are frequently found which are retained for traffic distribution in the sense of the ECMP concept. Other methods of determining least-cost paths, for example the Dijkstra algorithm, can be used just as well.

The above procedure can be used for re-determining the paths as part of the iterations for which the inventive method makes provision. After calculation of the paths P(LK) as a function of the link costs, the traffic matrix VM is used to determine the traffic volume V(L) of the individual links. The link L(Vmax,n) with the highest or maximum traffic volume Vmax,n is identified and the maximum traffic volume Vmax,n in this step is compared with the maximum traffic volume Vmax,n−1 in the previous step If the maximum traffic volume Vmax,n for the current step is less than the maximum traffic volume Vmax,n−1 for the previous step, the link costs LK(L(Vmax,n)) of the link L(Vmax,n) with the maximum traffic volume Vmax,n are increased by 1 and the paths P(LK) are recalculated as a function of the changed link costs LK. The loop is then executed once more. Otherwise, i.e. if the maximum traffic load Vmax,n is greater than in the previous step, the link costs LK determined in the previous step are used as optimized link costs LKOpt and the associated paths P(LK) are used as the paths P(LKopt) determined for an optimized traffic distribution for routing.

The invention claimed is:

1. A method for adapting link weights in a communication network formed with links for an optimized traffic distribution within the communication network in respect of a traffic volume expected for the communication network and in relation to a parameter relating to the link usage, the method comprising:
   a) assigning start values for the link weights to the links of the communication network;
   b) calculating paths for routing of traffic within the communication network on basis of the link weights;
   c) determining values of the parameter for the links using the calculated paths and the expected traffic volume;
   d) determining such link for which the parameter has the highest value;
   e) increasing the link weight for the determined link, and
   f) repeating the steps b), c), d) and e) until the value of the parameter for the determined link is higher than the value of the parameter for the determined link relative to a preceding step d), wherein
   the steps a) to f) are performed with aid of a data processor, and wherein the paths calculated are used for routing.

2. The method in accordance with claim 1, wherein the parameter is produced by an absolute traffic load, a relative traffic load related to link bandwidth traffic-related costs arising for using the link, a link availability, a delay time of a relevant link, or load capabilities of an end node of the relevant link.

3. The method in accordance with claim 2, wherein the start values for the link weights are the same for all links.

4. The method in accordance with claim 2, wherein the paths are calculated using an OSPF (open shortest path first) protocol or an IS-IS (Intermediate System-Intermediate System) protocol.

5. The method in accordance with claim 2, wherein the paths calculated if abort criterion f) is fulfilled are used for routing within a framework of a ECMP (Equal Cost Multi Path) concept.

6. The method in accordance with claim 2, wherein the link weights and their increase are always expressed by whole numbers.

7. The method in accordance with claim 2, wherein the link weight is increased for both directions of transmission of the link for the link determined.

8. The method in accordance with claim 2, wherein the expected traffic volume is. described by a traffic matrix.

9. The method in accordance with claim 1, wherein the start values for the link weights are the same for all links.

10. The method in accordance with claim 9, wherein the paths are calculated using an OSPF (open shortest path first) protocol or an IS-IS (Intermediate System-Intermediate System) protocol.

11. The method in accordance with claim 9, wherein the paths calculated if abort criterion f) is fulfilled are used for routing within a framework of a ECMP (Equal Cost Multi Path) concept.

12. The method in accordance with claim 9, wherein the link weights and their increase are always expressed by whole numbers.

13. The method in accordance with claim 9, wherein the link weight is increased for both directions of transmission of the link for the link determined.

14. The method in accordance with claim 1, wherein the paths are calculated using an OSPF (open shortest path first) protocol or an IS-IS (Intermediate System-Intermediate System) protocol.

15. The method in accordance with claim 1, wherein the paths calculated if abort criterion f) is fulfilled are used for routing within a framework of a ECMP (Equal Cost Multi Path) concept.

16. The method in accordance with claim 1, wherein the paths calculated if abort criterion f) is fulfilled are used for routing within a framework of a ECMP (Equal Cost Multi Path) concept.

17. The method in accordance with claim 1, wherein the link weights and their increase are always expressed by whole numbers.

18. The method in accordance with claim 1, wherein the link weight is increased for both directions of transmission of the link for the link determined.

19. The method in accordance with claim 1, wherein the expected traffic volume is described by a traffic matrix.

* * * * *